US007356437B2

(12) United States Patent
Kobayashi et al.

(10) Patent No.: US 7,356,437 B2
(45) Date of Patent: Apr. 8, 2008

(54) INFORMATION PROCESSING APPARATUS, IMAGING APPARATUS, INFORMATION PROCESSING METHOD, AND COMPUTER PROGRAM

(75) Inventors: Kou Kobayashi, Tokyo (JP); Kenichiro Imai, Kanagawa (JP); Katsuhiko Watanabe, Saitama (JP); Junichi Yokota, Kanagawa (JP); Ryogo Ito, Tokyo (JP); Hiroshi Shimono, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 11/468,668

(22) Filed: Aug. 30, 2006

(65) Prior Publication Data

US 2007/0067139 A1    Mar. 22, 2007

(30) Foreign Application Priority Data

Sep. 21, 2005    (JP)    ............................ P2005-273252

(51) Int. Cl.
*G06F 15/00* (2006.01)
*G01P 15/00* (2006.01)

(52) U.S. Cl. ........................ 702/127; 348/347; 360/60; 702/141

(58) Field of Classification Search ................ 702/141, 702/150, 182; 360/60, 75; 73/65.01; 711/170; 348/347

See application file for complete search history.

(56) References Cited

U.S. PATENT DOCUMENTS

| 6,101,062 | A | * | 8/2000 | Jen et al. ....................... 360/75 |
| 6,212,026 | B1 | * | 4/2001 | Ohmi et al. ................... 360/60 |
| 6,612,157 | B2 | * | 9/2003 | Urano et al. ................ 73/65.01 |
| 6,754,029 | B2 | * | 6/2004 | Ito ................................ 360/75 |
| 7,142,385 | B2 | * | 11/2006 | Shimotono et al. ............ 360/60 |
| 2006/0116848 | A1 | | 6/2006 | Clifford et al. |
| 2006/0136168 | A1 | * | 6/2006 | Nakamura et al. .......... 702/141 |
| 2006/0152842 | A1 | * | 7/2006 | Pasolini et al. ................ 360/75 |
| 2007/0013805 | A1 | * | 1/2007 | Suk ............................. 348/347 |

FOREIGN PATENT DOCUMENTS

JP    2000241442    9/2000

* cited by examiner

*Primary Examiner*—John Barlow
*Assistant Examiner*—John Le
(74) *Attorney, Agent, or Firm*—Bell, Boyd and Lloyd LLP (57) ABSTRACT

An information processing apparatus, an imaging apparatus, and an information processing method, and a computer program are provided. An information processing apparatus includes: an acceleration detecting part which detects an acceleration generated in the information processing apparatus; a storage part which stores history information based on information detected by the acceleration detecting part; and a control part which executes a determination process whether the information processing apparatus is in a falling state based on information detected by the acceleration detecting part and history information stored in the storage part.

8 Claims, 8 Drawing Sheets

FIG. 2

| | VALUE OF THREE AXES (Gx) | VALUE OF THREE AXES (Gy) | VALUE OF THREE AXES (Gz) | RESULTANT VALUE (Gavg) |
|---|---|---|---|---|
| TIME = 0 (AT PRESENT) | 0 | 0 | 0 | 0 |
| TIME = 0 − a | 0.3 | 0.6 | 0 | 0.4 |
| TIME = 0 − 2a | 1 | 1.1 | 0 | ... |
| TIME = 0 − 3a | ... | ... | ... | |
| TIME = 0 − 4a | ... | | | |

(a) MEASUREMENT TIMING t = 0 − 4a, t = 0 − 3a, t = 0 − 2a, t = 0 − a, t = 0 (AT PRESENT) → TIME t

INFORMATION PROCESSING APPARATUS, IMAGING APPARATUS, INFORMATION PROCESSING METHOD, AND COMPUTER PROGRAM

CROSS REFERENCES TO RELATED APPLICATIONS

The present application claims priority to Japanese Patent Application JP 2005-273252 filed in the Japanese Patent Office on Sep. 21, 2005, the entire contents of which is being incorporated herein by reference.

BACKGROUND

The present invention generally relates to an information processing apparatus, an imaging apparatus, an information processing method, and a computer program, particularly to an information processing apparatus, an imaging apparatus, an information processing method, and a computer program, which can perform fall detection in precision devices in a suitable and appropriate manner.

More specifically, the present invention relates to an information processing apparatus, an imaging apparatus, an information processing method, and a computer program, which can perform fall detection in a suitable and appropriate manner and can prevent a hard disk drive from being damaged because of an impact as well as can prevent undesired head retraction because of wrong fall detection in devices provided with a hard disk drive as a data recording module, the devices including a camera and a PC.

In recent years, with the reduction in size of a HDD (hard disk drive), a HDD is adopted as a recording medium for various devices such as an imaging apparatus including a digital camera and a digital video camera. However, the HDD has a problem that it is vulnerable to a mechanical impact. When a great impact is given to the HDD because a device falls with its head on a disc during data write or readout processing, the HDD might be unusable because of the damaged head.

In order to prevent the HDD from being damaged because of such a fall, some devices have a scheme in which an acceleration sensor is mounted on a device mounted with a HDD to detect a fall by the sensor, right after the device starts falling, the head of the HDD is retracted from a disc before an impact occurs, and thus damage is prevented. When the head is retracted, a predetermined recovery process sequence is done such that it is confirmed whether the device is returned to a stable state, for example, and after that, a process is executed to return to an operable state.

The head retraction process like this is done to prevent the head from being damaged and to avoid the HDD unusable. In the fall detection by the acceleration sensor, generally, the falling state is determined when the measured value by the acceleration sensor is 0 G. However, actually, the measured value by the acceleration sensor is sometimes 0 G also in the case in which a user moves a device such as a camera and a PC as a device mounted with a HDD. Also for this state, it is determined that the device is in the falling state to retract the head of the HDD from the disc. When this is done, a user may not use the device during the period of the recovery process sequence. For example, suppose the device is a camera, a user may miss a chance to take a picture.

SUMMARY

It is desirable to provide an information processing apparatus, an imaging apparatus, an information processing method, and a computer program, which can perform fall detection in precision devices in a suitable and appropriate manner.

Furthermore, it is desirable to provide an information processing apparatus, an imaging apparatus, an information processing method, and a computer program, which perform fall detection in a suitable and appropriate manner and prevent an undesired head retraction process for a HDD in an information processing apparatus such as a camera and a PC having a fall detection mechanism.

An embodiment is an information processing apparatus including: an acceleration detecting part which detects an acceleration generated in the information processing apparatus; a storage part which stores history information based on information detected by the acceleration detecting part; and a control part which executes a determination process whether the information processing apparatus is in a falling state based on information detected by the acceleration detecting part and history information stored in the storage part.

Furthermore, in the information processing apparatus according to an embodiment, the control part is configured to execute: a first determination process which determines whether the information processing apparatus is in a zero gravity state based on information detected by the acceleration detecting part; and a second determination process which executes a determination process whether the information processing apparatus is in the falling state by applying acceleration detection information in the past about the information processing apparatus based on history information stored in the storage part when it is determined that the information processing apparatus is in the zero gravity state in the first determination process.

Furthermore, in the information processing apparatus according to an embodiment, for the second determination process, the control part is configured to acquire acceleration detection information from the storage part for a period right before a period that the information processing apparatus reaches the zero gravity state, to execute a determination process whether a force equal to or greater than a predetermined threshold is applied to the information processing apparatus in a period before the information processing apparatus reaches the zero gravity state based on the acceleration detection information in the period, and to determine whether the information processing apparatus is in the falling state based on the determination result.

Furthermore, in the information processing apparatus according to an embodiment, for the second determination process, the control part is configured to acquire acceleration detection information from the storage part for a period right before a period that the information processing apparatus reaches the zero gravity state, to execute a determination process based on a variation in the acceleration per unit time until the information processing apparatus reaches the zero gravity state based on the acceleration detection information in the period, and to determine whether the information processing apparatus is in the falling state based on the determination result.

Furthermore, in the information processing apparatus according to an embodiment, the acceleration detecting part is a three-axis acceleration sensor which detects accelerations of three orthogonal axes of an X-axis, a Y-axis and a Z-axis, and the control part is configured to compute a resultant value (Gavg) based on measured values in X-axis, Y-axis, and Z-axis directions detected by the three-axis acceleration sensor, to store the resultant value in the storage part, and to execute a determination process whether the information processing apparatus is in the falling state based on the resultant value.

Furthermore, in the information processing apparatus according to an embodiment, the control part is configured to execute a process to compute a sum square value of acceleration information Gx, Gy, and Gz in X-axis, Y-axis, and Z-axis directions detected by the three-axis acceleration sensor as the resultant value (Gavg).

Furthermore, in an embodiment an imaging apparatus including: a hard disk drive which stores taken image data; an acceleration detecting part which detects an acceleration generated in an information processing apparatus; a storage part which stores history information based on information detected by the acceleration detecting part; and a control part which executes a determination process whether the information processing apparatus is in a falling state based on information detected by the acceleration detecting part and history information stored in the storage part and which executes a head retraction process for the hard disk drive based on a determination that the apparatus is in a falling state.

Furthermore, in the imaging apparatus according to an embodiment, the control part is configured to execute: a first determination process which determines whether the information processing apparatus is in a zero gravity state based on information detected by the acceleration detecting part; and a second determination process which executes a determination process whether the information processing apparatus is in the falling state by applying acceleration detection information in the past about the information processing apparatus based on history information stored in the storage part when it is determined that the information processing apparatus is in the zero gravity state in the first determination process.

Furthermore, an embodiment is an information processing method including the steps of: detecting an acceleration generated in an information processing apparatus; storing history information based on information detected at the acceleration detecting step in a storage part; and detecting fall by executing a determination process whether the information processing apparatus is in a falling state based on information detected at the acceleration detecting step and history information stored in the storage part.

Furthermore, in the information processing method according to an embodiment, the fall determination step is the step of executing: a first determination process which determines whether the information processing apparatus is in a zero gravity state based on information detected at the acceleration detecting step, and a second determination process which executes a determination process whether the information processing apparatus is in the falling state by applying acceleration detection information in the past about the information processing apparatus based on history information stored in the storage part when it is determined that the information processing apparatus is in the zero gravity state in the first determination process.

Furthermore, in the information processing method according to an embodiment, for the second determination process, the fall determination step is the step of: acquiring acceleration detection information from the storage part for a period right before a period that the information processing apparatus reaches the zero gravity state, executing a determination process whether a force equal to or greater than a predetermined threshold is applied to the information processing apparatus in a period before the information processing apparatus reaches the zero gravity state based on the acceleration detection information in the period, and determining whether the information processing apparatus is in the falling state based on the determination result.

Furthermore, in the information processing method according to an embodiment, for the second determination process, the fall determination step is the step of: acquiring acceleration detection information from the storage part for a period right before a period that the information processing apparatus reaches the zero gravity state, executing a determination process based on a variation in the acceleration per unit time until the information processing apparatus reaches the zero gravity state based on the acceleration detection information in the period, and determining whether the information processing apparatus is in the falling state based on the determination result.

Furthermore, in the information processing method according to an embodiment, the acceleration detecting step is an acceleration detecting step done by a three-axis acceleration sensor which detects accelerations of three orthogonal axes of an X-axis, a Y-axis and a Z-axis, and the fall determination step is the step of: computing a resultant value (Gavg) based on measured values in X-axis, Y-axis, and Z-axis directions detected by the three-axis acceleration sensor, and executing a determination process whether the information processing apparatus is in the falling state based on the resultant value.

Furthermore, in the information processing method according to an embodiment, the fall determination step is the step of executing a process to compute a sum square value of acceleration information Gx, Gy, and Gz in X-axis, Y-axis, and Z-axis directions detected by the three-axis acceleration sensor as the resultant value (Gavg).

Furthermore, an embodiment is a computer program which allows an information processing apparatus to execute a fall determination process, the computer program including instructions to execute: detecting an acceleration generated in an information processing apparatus; storing history information based on information detected at the acceleration detecting step in a storage part; and determining fall by executing a determination process whether the information processing apparatus is in a falling state based on information detected at the acceleration detecting step and history information stored in the storage part.

In addition, the computer program according to an embodiment is a computer program which can be offered to a general purpose computer system that can execute various program codes, by a storage medium which offers the program in a computer readable format, and a communication medium, for example, a storage medium such as CD, FD and MO, or through a communication medium such as a network. The program like this is provided in the computer readable format to implement the process corresponding to the program on the computer system.

Other purposes, features and advantages of the invention will be apparent from more detailed description based on an embodiment of the invention described later and the accompanying drawings. In addition, in the specification, a system is the configuration of a logical set of plurality of devices, which is not limited to one that devices of individual configurations are in the same housing.

According to the configuration of an embodiment, the first determination process is executed which determines whether the apparatus is in the zero gravity state as the determination process whether the apparatus is falling, and the second determination process is executed which uses acceleration history information stored in the storage part to determine whether the apparatus is in the free fall state when it is sensed that the apparatus is in the zero gravity state. In the second determination process, the fall determination process is executed by determining whether the apparatus has had a great force before based on history information, or based on the speed reaching the zero gravity state. Thus, the state can be distinguished that a user lifts or flings down the apparatus. With this configuration, in a device mounted with a HDD, for example, a needless process can be prevented that the head is retracted when the apparatus is not falling, a user is not forced to have an interruption because of the process time for return, and working efficiency can be enhanced.

BRIEF DESCRIPTION OF THE FIGURES

FIGS. 2 and 2A show diagrams depicting exemplary data of acceleration history information to be recorded in a memory of the information processing apparatus.

FIGS. 5-1 and 5-2 show a diagram illustrative of a specific example of the fall determination process and a diagram illustrative of the change in resultant values when a gravity drop.

FIGS. 6-1 and 6-2 show a diagram illustrative of a specific example of the fall determination process and a diagram illustrative of the change in resultant values when an apparatus is flung up.

FIGS. 7-1 and 7-2 show a diagram illustrative of a specific example of the fall determination process and a diagram illustrative of the change in resultant values when an apparatus is flung down.

Additional features and advantages are described herein, and will be apparent from, the following Detailed Description and the figures.

DETAILED DESCRIPTION

A detailed description of an information processing apparatus, an imaging apparatus, an information processing method, and a computer program according to an embodiment will be described with reference to the drawings.

Figure 1:
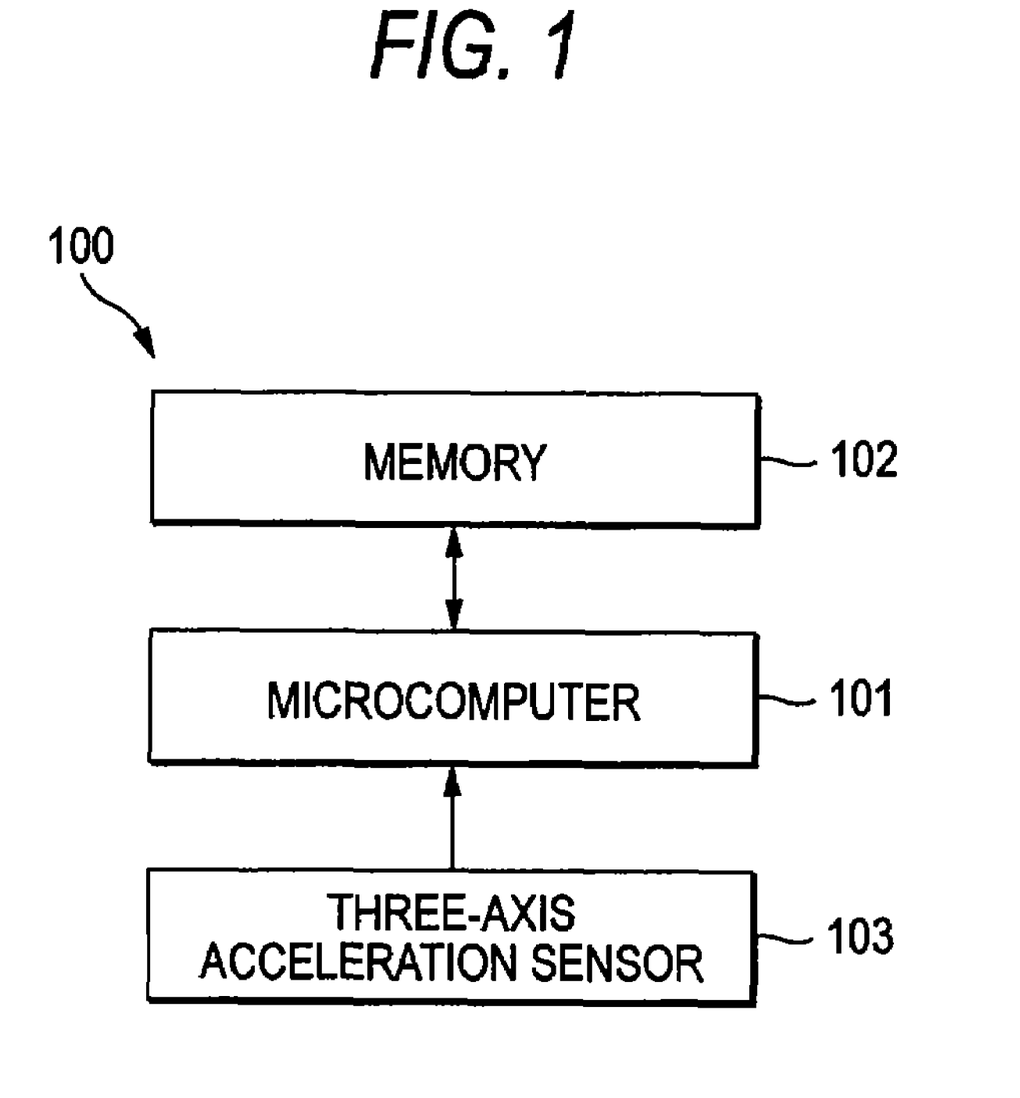
FIG. 1 shows a diagram depicting an exemplary basic configuration of an information processing apparatus according to an embodiment of the invention.

First, an exemplary basic configuration of the information processing apparatus according to an embodiment will be described with reference to FIG. 1. For example, the information processing apparatus is applicable to a number of different constitutions such as a camera, a PC, a disc recording device, and the like. First, the basic configuration of an information processing apparatus which is necessary to execute processes according to an embodiment will be described with reference to FIG. 1.

An information processing apparatus 100 has a microcomputer 101, a memory 102, and a three-axis acceleration sensor 103. The microcomputer 101 has a CPU which performs process control over the information processing apparatus 100 and has a storage area for an executing program, and the microcomputer functions as a control part.

The three-axis acceleration sensor 103 detects the accelerations corresponding to three orthogonal axes of the X-axis, the Y-axis, and the Z-axis, and is an acceleration detecting part which enters detected data to the microcomputer 101 as the control part. The microcomputer 101 periodically takes in the detected data by the acceleration sensor 103 at each of about 10 msec, for example. More specifically, it takes in acceleration (Gx, Gy, Gz) information that is applied to the information processing apparatus 100 and corresponds to the three orthogonal axes of the X-axis, the Y-axis, and the Z-axis.

The microcomputer 101 records the acceleration (Gx, Gy, Gz) information to the memory 102 based on the detected values by the acceleration sensor 103, the detected values are periodically inputted in accordance with a preset program as well as it computes a resultant value (Gavg) based on the accelerations (Gx, Gy, Gz) corresponding to the three orthogonal axes of the X-axis, the Y-axis, and the Z-axis, and records the computed resultant value (Gavg) in the memory 102 along with the accelerations (Gx, Gy, Gz) corresponding to the three orthogonal axes. The resultant value is a value that is computed as a sum square value of the acceleration values corresponding to the three orthogonal axes of the X-axis, the Y-axis, and the Z-axis, for example.

As described above, the microcomputer 101 records the accelerations (Gx, Gy, Gz) in each of the orthogonal axis directions and the resultant value (Gavg) in the memory 102, which are computed based on the output values from the three-axis acceleration sensor 103 at each of the measurement timings. Consequently, in the memory 102, acceleration history information in accordance with the time transition in the accelerations (Gx, Gy, Gz) in each of the orthogonal axis direction and the resultant value (Gavg).

The microcomputer 101 determines whether the information processing apparatus 100 is in a falling state (free fall) based on the input values from the three-axis acceleration sensor 103 and acceleration history information recorded in the memory 102. The microcomputer 101 makes a determination in such a way that the information processing apparatus is held by a user to fling up or down it, for example, or it is in the free fall state. A determination process to determine whether it is in a free fall by the microcomputer 101 is done by two determination steps below.

A. First Determination Step A

It is examined whether the resultant value computed from the individual output values in three axis directions inputted from the three-axis acceleration sensor 103 is near 0 G, and it is determined that an apparatus is in the zero gravity state when the resultant value is near 0 G.

B. Second Determination Step B

When it is sensed that the apparatus is in the zero gravity state in the first determination, the acceleration history information stored in the memory 102 is used to determine whether the apparatus is in the free fall state.

As described above, in the information processing apparatus according to an embodiment of the invention, it is a feature in that it is determined that the resultant value computed from the individual output values in the three axis directions is near 0 G as well as it is determined that as the second determination, acceleration history information is used to make an examination and a determination whether the apparatus is in the free fall state. According to the second determination process, for example, the states can be distinguished between the state in which the information processing apparatus is actually in the free fall state and the state in which a user flings up or down the apparatus.

Figure 2:
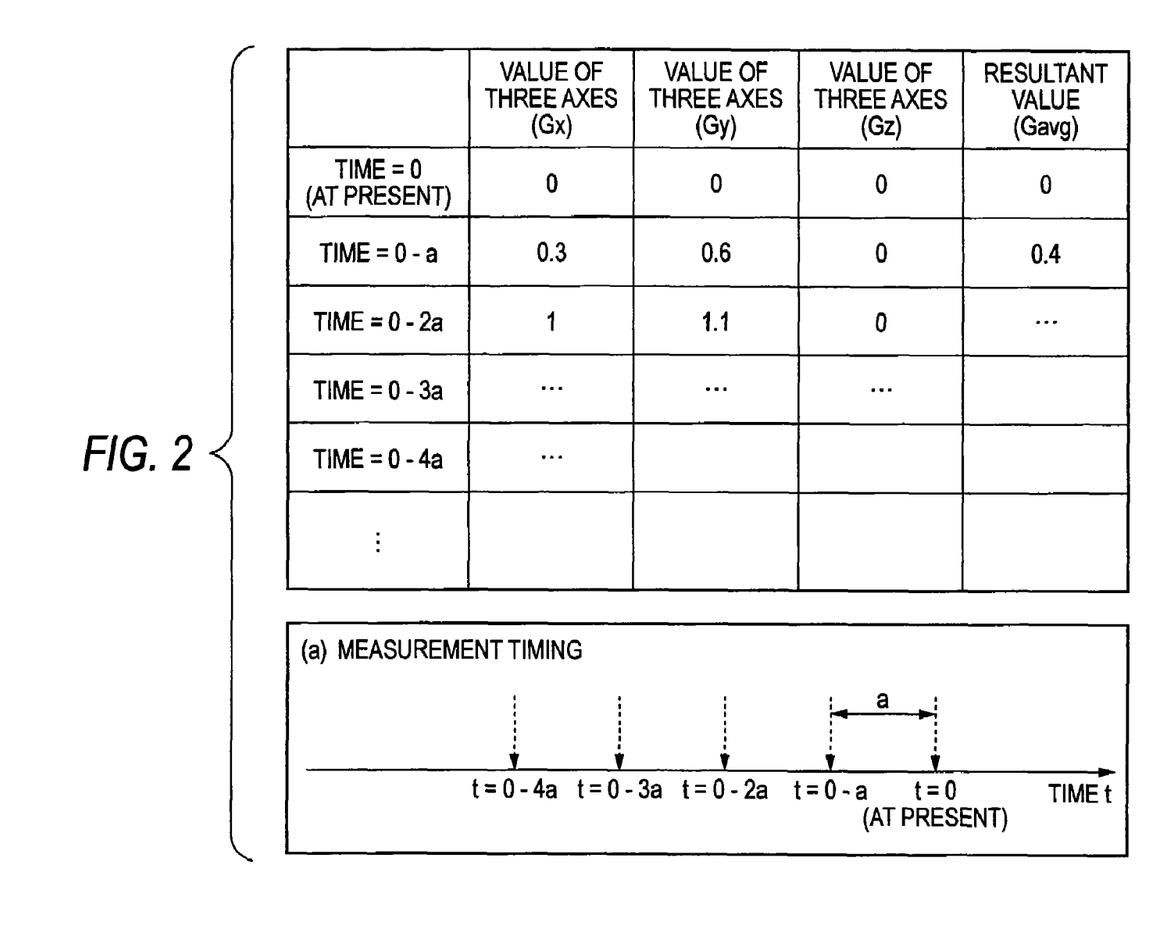

FIG. 2 shows an exemplary data configuration of acceleration history information to be stored in the memory 102. As shown in FIG. 2, in acceleration history information stored in the memory 102, the following is stored as history information: the acceleration (Gx, Gy, Gz) information corresponding to the three orthogonal axes of the X-axis, the Y-axis, and the Z-axis, and the resultant value (Gavg) based on the acceleration (Gx, Gy, Gz) information, for example, a sum square value of the acceleration values corresponding to the three orthogonal axes of the X-axis, the Y-axis, and the Z-axis. The acceleration history information shown in FIG. 2 is an example that records data based on the measurement timing shown in FIG. 2A, that is, based on information inputted from the three-axis acceleration sensor 103 at every time interval a as a measurement time interval=a. The measurement time interval=a is set at about 10 msec, for example.

Figure 3:
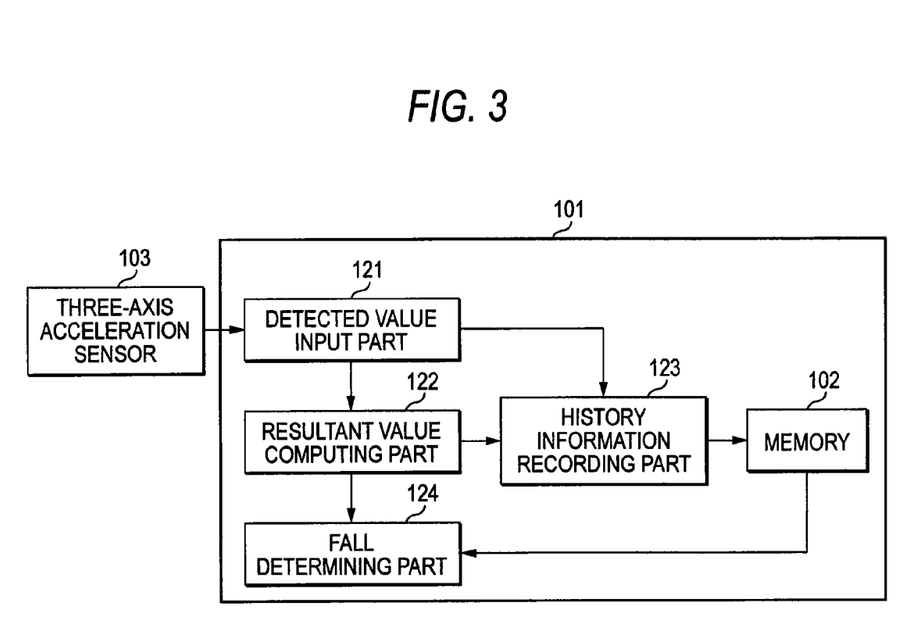
FIG. 3 shows a diagram depicting the functional configuration of a microcomputer as a control part of the information processing apparatus according to an embodiment of the invention.

The process of the microcomputer 101 will be described with reference to FIG. 3. The microcomputer 101 performs data processing based on a preset computer program. FIG. 3 shows a diagram illustrative of the process done by the microcomputer 101 based on the program, and shows a block diagram depicting that each of the process functions done by hardware and software is shown in blocks.

The microcomputer 101 periodically takes in the detected acceleration values corresponding to the three orthogonal axes of the X-axis, the Y-axis, and the Z-axis from the three-axis acceleration sensor 103 at a detected value input part 121, and outputs the input values to a resultant value computing part 122 and a history information recording part 123.

The resultant value computing part 122 computes the resultant value (Gavg) that is computed as the sum square value of Gx, Gy and Gz, for example, based on acceleration (Gx, Gy, Gz) information inputted from the detected value input part 121, and outputs the computed value to the history information recording part 123. The history information recording part 123 records the acceleration (Gx, Gy, Gz) information inputted from the detected value input part 121 and the resultant value (Gavg) inputted from the resultant value computing part 122 in the memory 102. According to the process, the acceleration history information shown in FIG. 2 is recorded in the memory 102. In addition, the memory 102 may be set in such a way that the latest history information for a fixed period (for example, a few seconds) is recorded therein in accordance with the recording capacity of the memory 102. More specifically, old history data is in turn replaced by new data and deleted.

A fall determining part 124 takes in the resultant value (Gavg) from the resultant value computing part 122 as well as it takes in the acceleration history information from the memory 102 to execute the determination process to determine whether the information processing apparatus is in the falling state.

Figure 4:
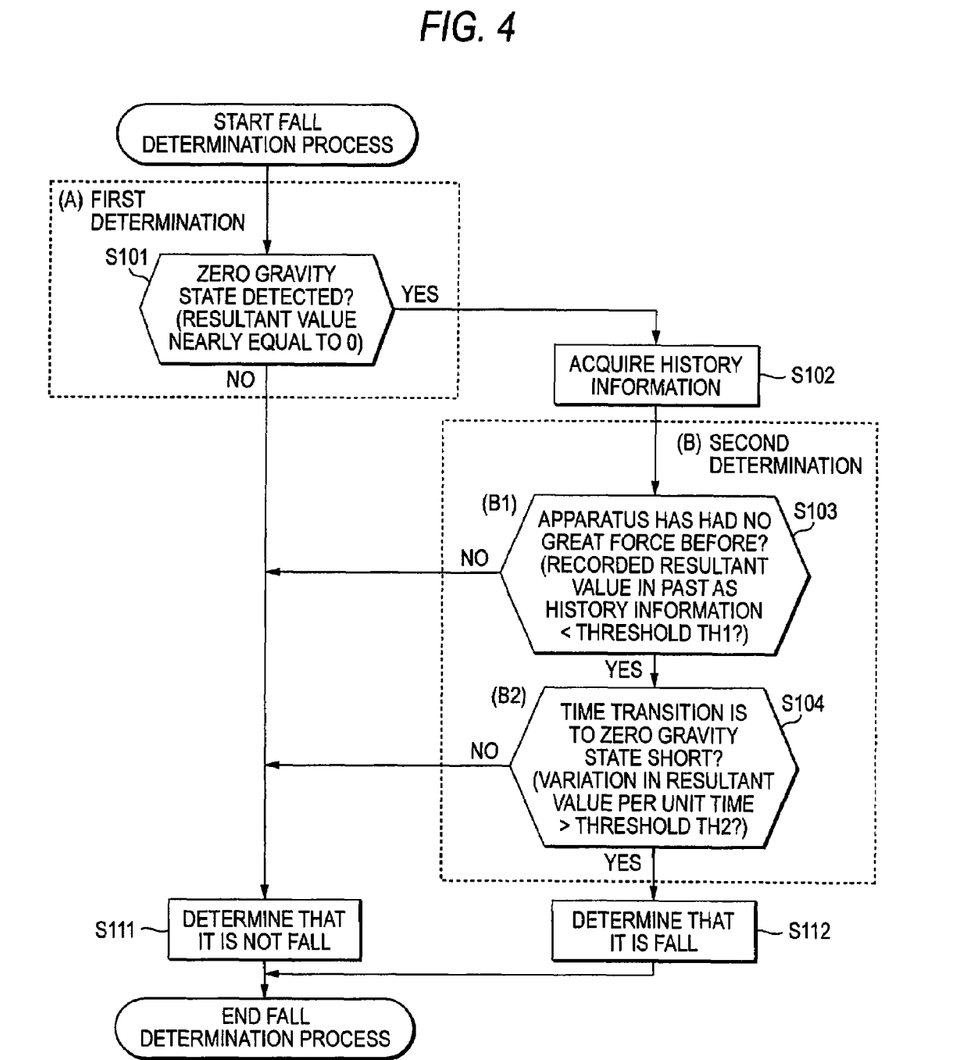
FIG. 4 shows a diagram depicting a flow chart illustrative of a sequence of a fall determination process executed in the information processing apparatus according to an embodiment of the invention.
Figure 5:
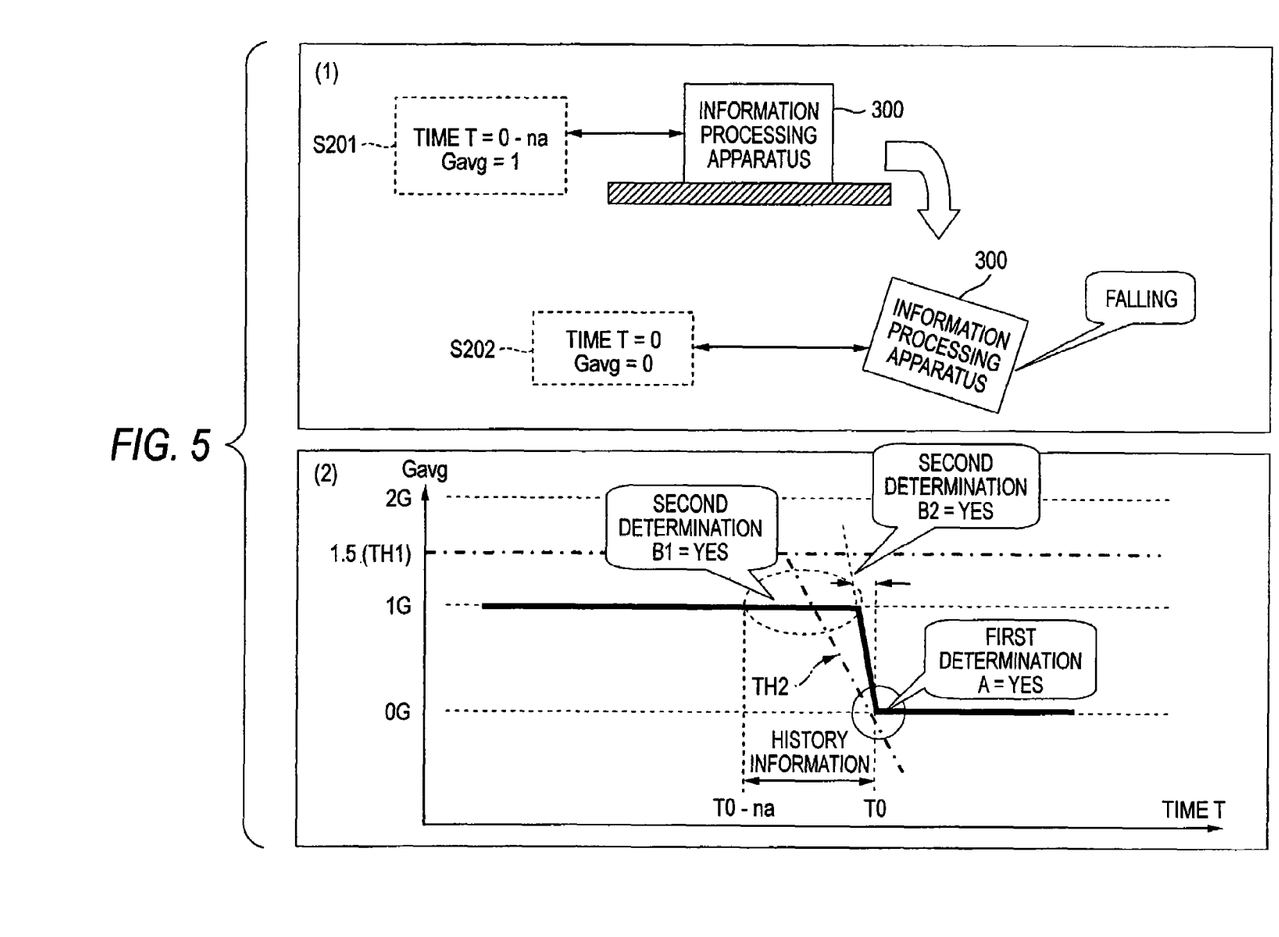
Figure 6:
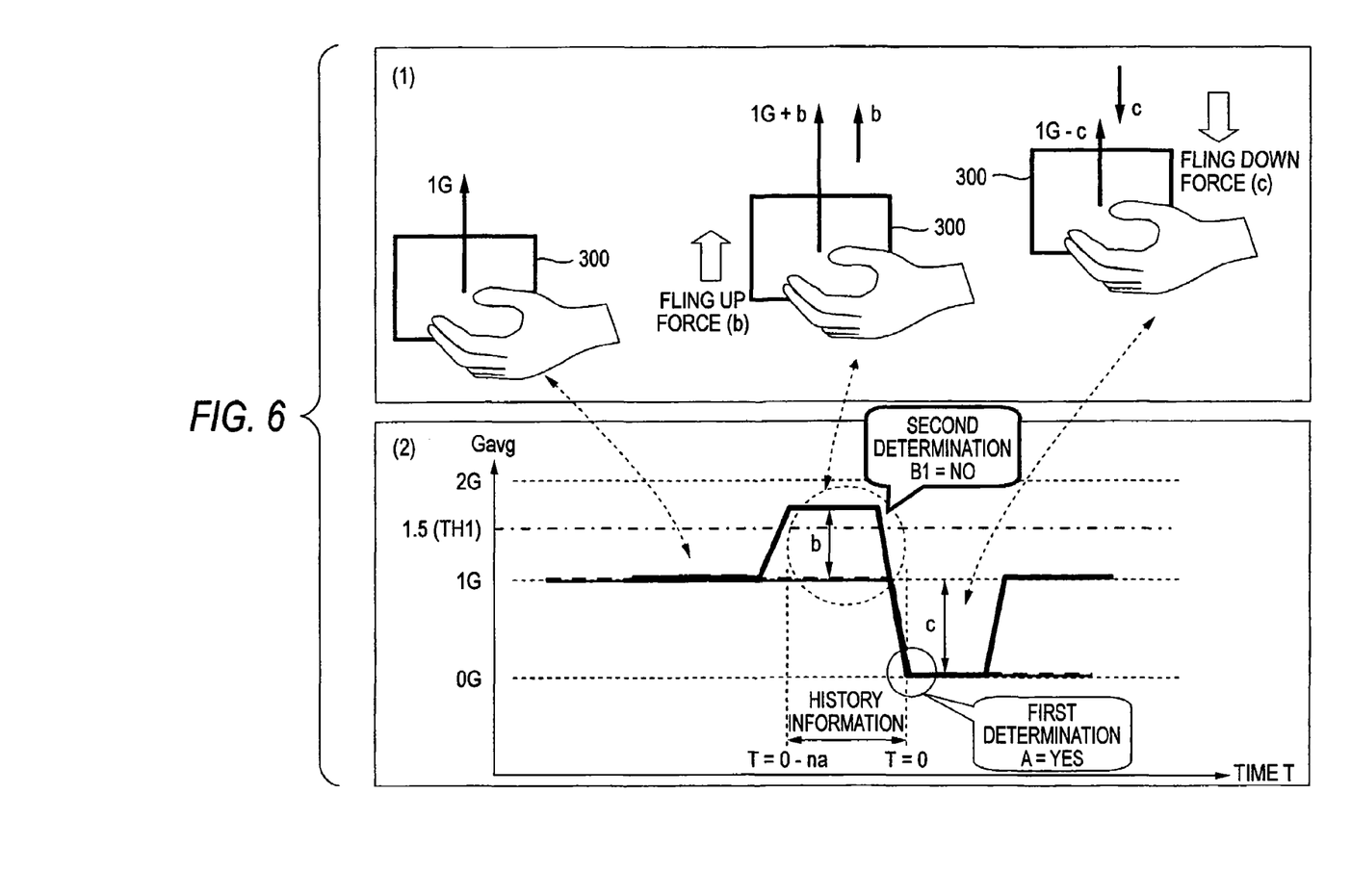
Figure 7:
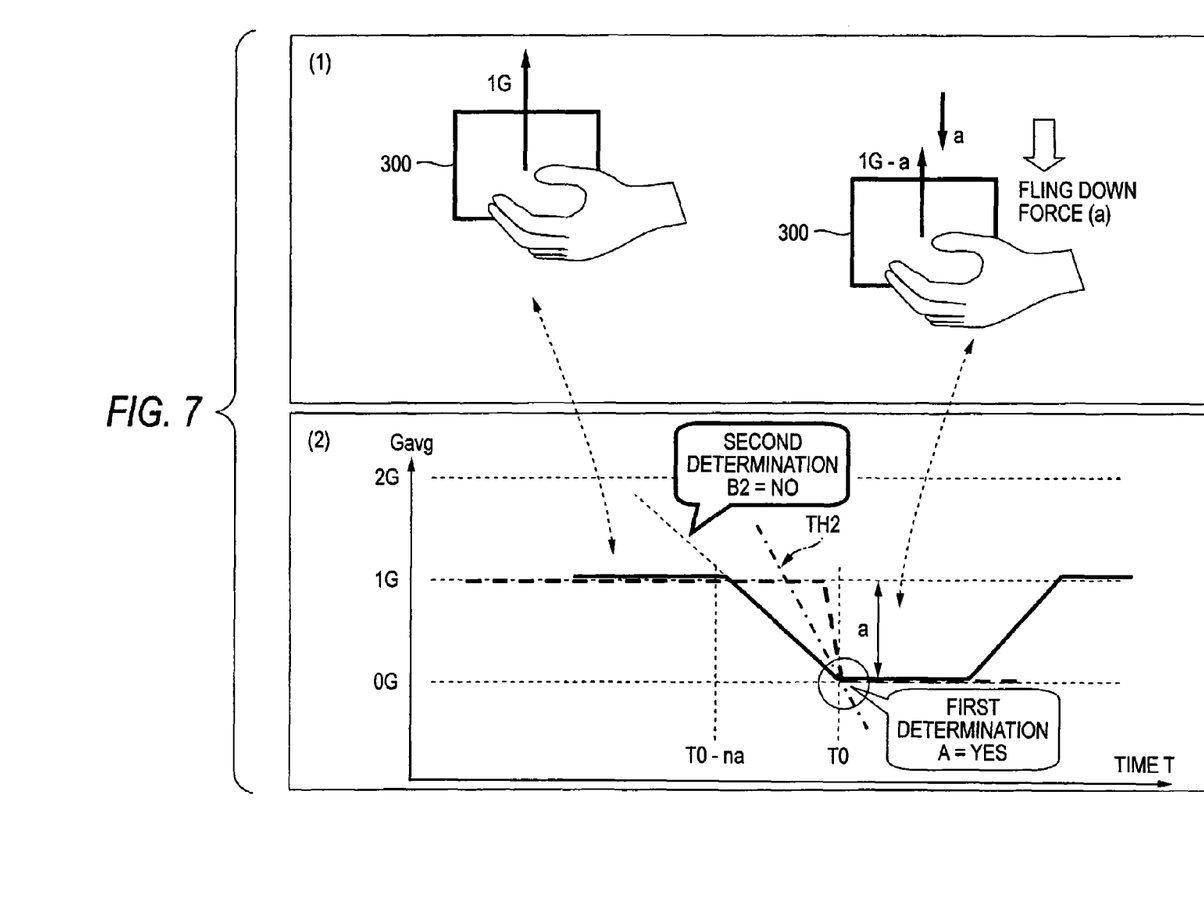

A fall determination process sequence done by the fall determining part 124 will be described with reference to a flow chart shown in FIG. 4. First, the outline will be described for a series of a flow of the fall determination process sequence, and the detail of the process of individual steps will be described later.

First, the outline will be described for a series of a flow of the fall determination process sequence. First, when it is detected that the apparatus is in the zero gravity state (S101), the values of history information stored in the memory 102 are confirmed to determine whether a great force has been applied for a period from the present time [T=0] to before a certain time period [T=na] based on the gravity acceleration (S103), where a is the measurement interval (for example, about 10 msec), and n is the number of samples. When it is determined that a great force is applied, it is not determined as a fall. The zero gravity state corresponds to this case, which occurs when the apparatus is flung up.

Subsequently, a determination process (S104) is done based on the variation in the gravity until the gravity reaches 0 G. Since the acceleration sensor acquires the measured values for a fixed time interval, the differential is calculated to compute the variation (differentiation value) in the force applied to the apparatus. When the variation (the differentiation value) in the gravity until the gravity reaching 0 G is close to the variation in a free fall (it is great enough), it is determined as a fall. For example, in such the case in which the apparatus is held by hands and flung down, the variation is smaller than that in a fall. Based on the comprehensive decisions, free fall detection is performed.

Hereinafter, a flow shown in FIG. 4 will be described in detail. First, at Step S101, it is determined whether the zero gravity state is detected. This is determined whether the resultant value (Gavg) computed by the resultant value computing part 122 shows zero based on the latest detected value at the three-axis acceleration sensor 103. When the resultant value shows that the value Gavg is nearly equal to zero, it is determined that the apparatus is in the zero gravity state and it is likely to be falling. The determination process is the process of the first determination step described above, that is, it corresponds to the determination process below.

First Determination Step A

It is examined whether the resultant value computed from the individual output values in three axis directions inputted from the three-axis acceleration sensor 103 is near 0 G, and it is determined that an apparatus is in the zero gravity state when the resultant value is near 0 G.

At Step S101, when it is determined as No, the process goes to Step S111, and it is determined that the apparatus does not fall to end the determination process. In addition, the fall determining part 124 takes in the resultant value in succession to make a determination at Step S101 for every input resultant value. At Step S101, when it is Yes, that is, when the resultant value Gavg is nearly equal to zero, it is determined that the apparatus is in the zero gravity state and it is likely to be falling. The process goes to Step S102.

The detail of the determination process at Step S101 will be described with reference to FIGS. 5-1 and 5-2. FIG. 5-1 shows a manner that an information processing apparatus 300 is falling, and FIG. 5-2 shows a graph depicting the time transition in the resultant value Gavg. As shown in FIG. 5-1, at Step S201, the information processing apparatus 300 is stationary at time [T=0−na]. At this time, only the downward force (the gravity) is applied to the information processing apparatus, resulting in Gavg=1. At Step S202, time [T=0], the information processing apparatus 300 is in the falling state, and the value Gavg is nearly equal to zero.

The time transition in the resultant value Gavg at this time is as shown in a graph in FIG. 5-2. In FIG. 5-2, time goes rightward, and the vertical direction shows the resultant value Gavg. At time [T=0], the value Gavg is nearly equal to zero. At this point in time, the first determination process A at Step S101 shown in FIG. 4 is executed. It is determined as Yes in the first determination process, and it is determined that the apparatus is likely to be falling. However, at this point in time, it is not decided that the apparatus is falling, and the process goes to the subsequent Step S102.

When the process goes to Step S102, history information is acquired from the memory. In the history information, accelerations in three axis directions and the resultant value at each of the measurement timings are recorded as described with reference to FIG. 2.

Steps S103 and S104 are the process steps of the second determination step described above, that is, they correspond to the determination process steps below.

Second Determination Step B

When it is sensed that the apparatus is in the zero gravity state in the first determination, the acceleration history information stored in the memory 102 is used to determine whether the apparatus is in the free fall state.

The second determination step includes two determination processes at Step S103 (B1) and Step S104 (B2). First, at Step S103, it is determined that the apparatus has had a great force before. More specifically, this is done as the process that compares the resultant value (Gavg) recorded as history information with a threshold TH1, and compares the resultant value Gavg included in the recorded information for a fixed period in the past with the threshold TH1. For example, a plurality of items of recorded information for a period from T=(0−na) to T=0 is taken out of history information recorded in the memory, and it is examined whether the following equation is held for each of items of the acquired information:

Gavg<TH1 where a is the measurement interval (for example, 10 msec), and n is an integer showing the number of samples.

When the following equation is held for the past history information acquired from history information, Gavg<TH1 that is, when it is determined that the apparatus has not had a great force for a fixed period T=0 in the past, the process goes to Step S104.

When the following equation is not held for the past history information acquired from history information, Gavg<TH1 that is, when it is determined that the apparatus has had a great force for a fixed period T=0 in the past, the process goes to Step S111 and it is determined that the apparatus is not in the falling state.

The determination process (B1) at Step S103 is the determination process that is executed as the process to determine whether a user flings up the apparatus or the apparatus is falling, for example. The determination process (B1) at Step S103 will be described with reference to FIGS. 6-1 and 6-2 and FIGS. 5-1 and 5-2.

FIG. 6-1 shows an exemplary operation in which a user flings up and down an apparatus, and FIG. 6-2 shows a graph depicting the change in the resultant value Gavg in this state transition. A thick solid line is a graph depicting the change in the resultant value Gavg corresponding to the operation that the user flings up and down an apparatus. In the graph shown in FIG. 6-2, the value Gavg is nearly equal to zero at time [T=0], and it is Yes for the determination (the first determination A) at Step S101 shown in FIG. 4 at this point in time. Subsequently, for the second determination process, the determination (B1) at Step S103 is done based on history information.

As shown in FIG. 6-1, when the apparatus 300 is flung up, the apparatus is moved upward with an acceleration against gravity. Therefore, a greater force (1 G+b) is applied than that in the stationary state (1 G). After that, when the apparatus drops down to the original position, a state that is almost the same as a fall occurs, the force applied to the apparatus becomes small, and it is measured that the value Gavg is nearly equal to zero. The point to measure that the value Gavg is nearly equal to zero is time [T=0]. At this point in time, it is Yes for the determination of the first determination process at Step S101 in the flow shown in FIG. 4, and the second determination process after Step S103 is done.

In the second determination process after Step S103, based on the past history information acquired from history information, it is determined whether the following equation is held for the determination process whether the apparatus has had a great force before.

Gavg<TH1

For example, as shown in FIG. 6-2, the threshold TH1 is set as:

TH1=1.5 G

In the graph shown in FIG. 6-2, the measured value (Gavg) in the past for the period from time T=0 to (0−na) acquired from history information includes the following resultant value:

Gavg>1.5

More specifically, the resultant value Gavg that is computed based on the force measured in the fling up state is greater than the threshold 1.5 G. Therefore, it is No for the result whether the following determination equation at Step S103 is held, and the process goes to Step S111.

Gavg<TH1

The final determination is made that the apparatus is not in the falling state.

The determination process at Step S103 when the apparatus is actually falling will be described with reference to FIGS. 5-1 and 5-2. In the graph shown in FIG. 5-2, the measured value (Gavg) in the past for the period from time T=(0−na) to T=0 acquired from history information does not include the following resultant value:

Gavg>1.5

More specifically, the state is changed from the stationary state (Gavg=1) to the falling state, and the measured value (Gavg) in the past for the period from time T=0 to (0−na) acquired from history information does not include data having the resultant value (Gavg) equal to or greater than the threshold (TH1=1.5 G). Therefore, it is Yes for the determination result whether the following determination equation at Step S103 is held, and the process goes to Step S104.

Gavg<TH1

The determination step (B2) of the later second determination process is executed.

As similar to the process at Step S103, the determination step (B2) at Step S104 is the fall determination process that uses history information for a fixed period from the measured time [T=0] to the past. Here, the determination is made whether the transition in time to the zero gravity state is short. More specifically, the determination is made based on the transition in speed to the zero gravity state (Gavg is nearly equal to zero). More specifically, for example, the transition in speed from the stationary state (Gavg=1) to the zero gravity state (Gavg is nearly equal to zero) is computed based on a time period taken for the transition. More specifically, the fall determination process is executed by the following determination equation that compares the variation in the resultant value per unit time ($\Delta Gavg/\Delta T$) with the threshold (TH2).

$$(\Delta Gavg/\Delta T) > TH2$$

For example, $\Delta Gavg/\Delta T$ corresponds to the slope in the graph shown in FIG. 5-2. When the slope is steep, it means that the transition in time to the zero gravity state (Gavg is nearly equal to zero) is short, that is, the transition in speed is fast, which is determined that the apparatus is falling.

More specifically, when the following determination equation is held, the process goes to Step S112.

$$(\Delta Gavg/\Delta T) > TH2$$

The final determination is made that the apparatus is falling. When the following determination equation is not held, the process goes to Step S111.

$$[(\Delta Gavg/\Delta T) > TH2]$$

The final determination is made that the apparatus is not falling.

The determination process (B2) at Step S104 is the determination process that is done as the process to distinguish between the state in which a user flings down the apparatus, for example, and the falling state. The determination process (B2) at Step S104 will be described with reference to FIGS. 7-1 and 7-2 and FIGS. 5-1 and 5-2.

FIG. 7-1 shows an exemplary operation that a user flings down the apparatus, and FIG. 7-2 shows a graph depicting the change in the resultant value Gavg in the state transition. A thick solid line shows a graph depicting the change in the resultant value Gavg corresponding to the operation that the user flings down the apparatus. In the graph shown in FIG. 7-2, the value Gavg is nearly equal to zero at time [T=0], and it is Yes for the determination (the first determination A) at Step S101 shown in FIG. 4 at this point in time. Subsequently, for the second determination process based on history information, the determination process at Step S103 (B1) is executed and then the determination process (B2) at Step S104 is executed.

As shown in FIG. 7-1, when the apparatus 300 is flung down, the force is dropped from the stationary state (1 G) to generate the state almost the same as a fall, the force applied to the apparatus becomes small, and it is measured that the value Gavg is nearly equal to zero. The point to measure that Gavg is nearly equal to zero is time [T=0]. At this point in time, it is Yes for the determination in the first determination process at Step S101 in the flow shown in FIG. 4, which is determined that the apparatus is likely to be falling.

At Step S104, based on the past history information acquired from history information, it is determined whether the transition in time to the zero gravity state is short. More specifically, the fall determination process is executed by the following determination equation that compares the variation in the resultant value per unit time with the threshold.

$$(\Delta Gavg/\Delta T) > TH2$$

For example, $\Delta Gavg/\Delta T$ corresponds to the slope in the graph shown in FIG. 7-2. When the slope is steep, the transition in time to the zero gravity state (Gavg is nearly equal to zero) is short, that is, the transition in speed is fast, which is determined that the apparatus is falling.

For example, the threshold TH2 showing the variation in the resultant value per unit time is set as the threshold (TH2) having the slope ($\Delta Gavg/\Delta T$) shown in FIG. 7-2. In the fling down of the apparatus shown in FIGS. 7-1 and 7-2, the speed is slow from Gavg=1 to G nearly equal to zero. As understood from the graph, the slope is gentle, and the following equation is not held:

$$(\Delta Gavg/\Delta T) > TH2$$

Therefore, it is No for the determination at Step S104, and the process goes to Step S111. The final determination is made that the apparatus is not in the falling state.

The determination process at Step S104 when the apparatus is actually falling will be described with reference to FIGS. 5-1 and 5-2. In the graph shown in FIG. 5-2, the transition in speed is fast from the stationary state (Gavg=1) to the zero gravity state (Gavg nearly equal to zero). As understood from the graph, the slope is a steep slope and the following equation is held:

$$(\Delta Gavg/\Delta T) > TH2$$

Therefore, it is Yes for the determination at Step S104, and the process goes to Step S112. The final determination is made that the apparatus is in the falling state.

As described above, the information processing apparatus according to an embodiment of the invention performs two determination steps below for the fall determination process.

First Determination Step A

It is examined whether the resultant value computed from the individual output values in three axis directions inputted from the three-axis acceleration sensor 103 is near 0 G, and it is determined that an apparatus is in the zero gravity state when the resultant value is near 0 G.

Second Determination Step B

When it is sensed that the apparatus is in the zero gravity state in the first determination, the acceleration history information stored in the memory 102 is used to determine whether the apparatus is in the free fall state.

Furthermore, in the second determination step B, (B1) it is distinguished that it is the fling up state in which a user lifts the apparatus by the determination process based on the determination whether the apparatus has had a great force before, and (B2) it is distinguished that it is the fling down state in which a user fling down the apparatus by the determination process based on the speed reaching zero gravity.

For these distinguish results, it is configured to make the final determination that the apparatus is not falling.

According to the process, for example, in a device mounted with a HDD, an undesired process can be avoided that the head is retracted when the apparatus is not falling, and a user is not forced to have an interruption because of the process time for return.

Figure 8:
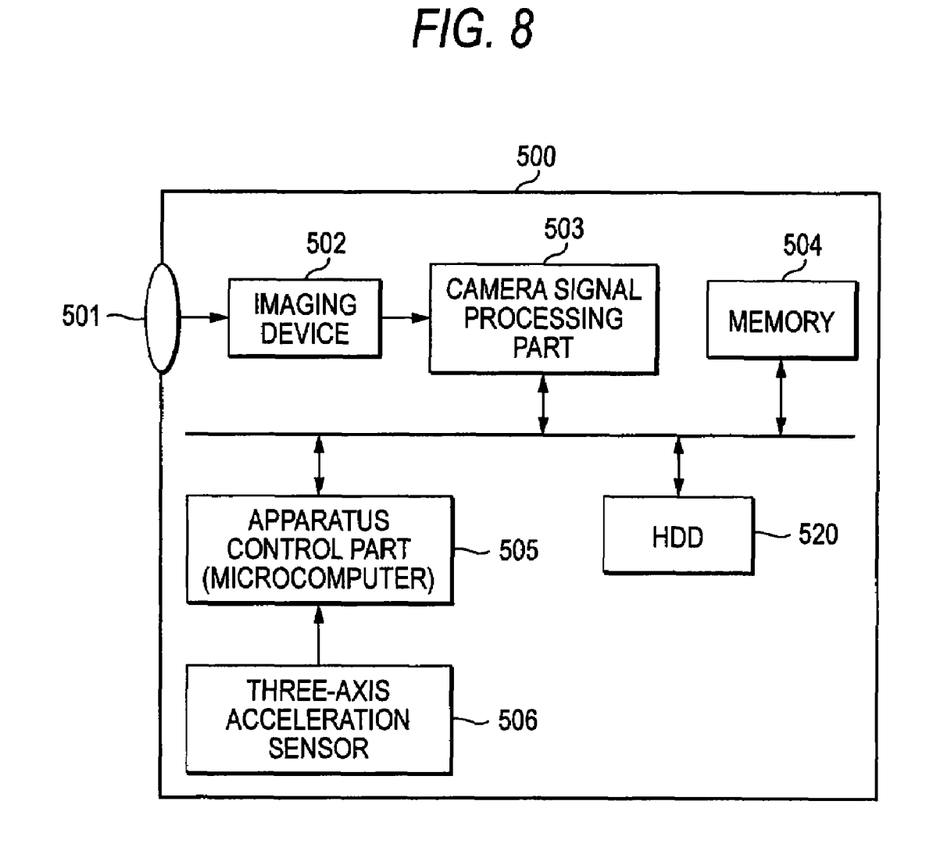
FIG. 8 shows a diagram illustrative of an exemplary configuration of an imaging apparatus as the information processing apparatus according to an embodiment of the invention.

The process configuration of fall detection according to an embodiment of the invention can be adapted to a camera and a PC that are mounted with a recording device such as a hard disk drive. For example, a camera is provided with the process configuration of fall detection according to an embodiment of the invention, and thus an undesired head retraction process can be prevented. The device configuration will be described with reference to FIG. 8, suppose the information processing apparatus according to an embodiment of the invention is an imaging apparatus such as a digital camera or a digital video camera mounted with a hard disk drive. A block diagram shown in FIG. 8 is a block diagram depicting the configuration of an information processing apparatus 500 as an imaging apparatus which is a portable, small-seized digital camera or a digital video camera mounted with a HDD (hard disk drive), and the apparatus has the configuration to record taken information in a hard disk drive 520.

The information processing apparatus (imaging apparatus) 500 has a lens block 501 which is formed of one or the combination of a plurality of lenses, an imaging device 502 such as a CCD, a camera signal processing part 503 which performs signal processing with respect to image data taken by the imaging device 502, including analog signal processing, A/D conversion, digital signal processing, and encoding, a data storage part (memory) 504 which temporarily stores image data processed at the camera signal processing part 503, a hard disk drive (HDD) 520 which has a hard disk that permanently stores image data recorded in the data storage part (memory) 504, and an apparatus control part (microcomputer) 505 which has a CPU that performs overall control over data taking and recording processes. Furthermore, it has an acceleration sensor 506 which measures accelerations in three axis directions of orthogonal X, Y, and Z axes.

The apparatus control part (microcomputer) 505 performs control over taking and recording data in the camera as well as performs the fall determination process described above. The acceleration sensor 506 is an acceleration detecting part which detects the accelerations each corresponding to the three orthogonal axes of the X-axis, the Y-axis, and the Z-axis, and enters the detected data to the apparatus control part (microcomputer) 505. The apparatus control part (microcomputer) 505 makes determination on the state of the information processing apparatus (imaging apparatus) 500 based on input information from the acceleration sensor 506, that is, it makes determination whether the apparatus is in the falling state in accordance with the process sequence described with reference to the flow chart shown in FIG. 4.

As the result of the fall determination process done by the apparatus control part (microcomputer) 505 in accordance with the process sequence described with reference to the flow chart shown in FIG. 4, when it is determined that the information processing apparatus (imaging apparatus) 500 is in the falling state, an emergency process such as the head retraction process of the hard disk drive (HDD) 520 and the stop of power supply to the hard disk drive (HDD) 520 are performed. According to the processes, the head of the hard disk drive (HDD) 520 is prevented from being damaged.

However, when a user lifts or flings down the camera, it is not determined as a fall, and the head retraction process is not executed. Therefore, the user does not have to wait for the return process in association with head retraction, and can take and record data quickly.

As described above, an embodiment of the invention has been described in detail with reference to the specific embodiment. However, it is apparent that a person skilled in the art can make modifications and substitutions of the embodiment with in the scope not deviating from the teaching of the invention.

In addition, a series of the processes described in the specification can be implemented by hardware, or software, or the combined configuration thereof. When the processes are implemented by software, a program recorded with the process sequence can be installed in a memory in a computer incorporated in hardware for exclusive use for implementation, or a program can be installed in a general purpose computer which can execute various processes for implementation.

For example, the program can be recorded beforehand in a hard disk drive and a ROM (Read Only Memory) as the recording medium. Alternatively, the program can be stored (recorded) temporarily or permanently in a removable recording medium such as a flexible disc, CD-ROM (Compact Disc Read Only Memory), MO (Magneto-optical) disc, DVD (Digital Versatile Disc), a magnetic disk and a semiconductor memory. The removable recording medium like this can be offered as so-called package software.

In addition to the installation of the program from the removable recording medium to the computer as described above, the program can be installed in such ways that it is transferred from a download site to a computer in a wireless manner, and that it is transferred to a computer through a network such as a LAN (Local Area Network) and the Internet in a cabled manner, the computer receives the program thus transferred and installs it in a recording medium such as a hard disk drive incorporated therein.

In addition, various processes described in the specification may be executed in a time series in accordance with the description as well as they may be implemented in parallel or separately depending on the process performance of an apparatus to execute the processes or as desired. In addition, in the specification, a system is the configuration of a logical set of plurality of devices, which is not limited to one that devices of individual configurations are in the same housing.

As described above, according to the configuration of an embodiment of the invention, as the determination process whether the apparatus is falling, the first determination process is executed which determines whether the apparatus is in the zero gravity state and the second determination process is executed which uses acceleration history information stored in the storage part to determine whether the apparatus is in the free fall state when it is sensed that the apparatus is in the zero gravity state. In the second determination process, the fall determination process is executed by determining whether the apparatus has had a great force before based on history information, or based on the speed reaching the zero gravity state. Thus, the state can be distinguished that the user lifts or flings down the apparatus. With this configuration, in a device mounted with a HDD, for example, a needless process can be prevented that the head is retracted when the apparatus is not falling, a user is not forced to have an interruption because of the process time for return, and working efficiency can be enhanced.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An information processing apparatus comprising:
   an acceleration detecting part which detects an acceleration generated in the information processing apparatus;
   a storage part which stores history information based on information detected by the acceleration detecting part; and
   a control part which executes a determination process whether the information processing apparatus is in a falling state based on information detected by the acceleration detecting part and history information stored in the storage part, wherein the control part is configured to execute:
a first determination process which determines whether the information processing apparatus is in a zero gravity state based on information detected by the acceleration detecting part; and
a second determination process which executes a determination process whether the information processing apparatus is in the falling state by applying acceleration detection information in the past about the information processing apparatus based on history information stored in the storage part when it is determined that the information processing apparatus is in the zero gravity state in the first determination process, wherein for the second determination process, the control part is configured to acquire acceleration detection information from the storage part for a period right before a period that the information processing apparatus reaches the zero gravity state, to execute a determination process whether a force equal to or greater than a predetermined threshold is applied to the information processing apparatus in a period before the information processing apparatus reaches the zero gravity state based on the acceleration detection information in the period, and to determine whether the information processing apparatus is in the falling state based on the determination result.

2. The information processing apparatus according to claim 1, wherein for the second determination process, the control part is configured to acquire acceleration detection information from the storage part for a period right before a period that the information processing apparatus reaches the zero gravity state, to execute a determination process based on a variation in the acceleration per unit time until the information processing apparatus reaches the zero gravity state based on the acceleration detection information in the period, and to determine whether the information processing apparatus is in the falling state based on the determination result.

3. The information processing apparatus according to claim 1, wherein the acceleration detecting part is a three-axis acceleration sensor which detects accelerations of three orthogonal axes of an X-axis, a Y-axis and a Z-axis, and
the control part is configured to compute a resultant value (Gavg) based on measured values in X-axis, Y-axis, and Z-axis directions detected by the three-axis acceleration sensor, to store the resultant value in the storage part, and to execute a determination process whether the information processing apparatus is in the falling state based on the resultant value.

4. The information processing apparatus according to claim 3, wherein the control part is configured to execute a process to compute a sum square value of acceleration information Gx, Gy, and Gz in X-axis, Y-axis, and Z-axis directions detected by the three-axis acceleration sensor as the resultant value (Gavg).

5. An information processing method comprising:
detecting an acceleration generated in an information processing apparatus;
storing history information based on information detected at the acceleration detecting step in a storage part; and
determining fall by executing a determination process whether the information processing apparatus is in a falling state based on information detected at the acceleration detecting step and history information stored in the storage part, wherein the fall determination step is the step of executing:
a first determination process which determines whether the information processing apparatus is in a zero gravity state based on information detected at the acceleration detecting step, and
a second determination process which executes a determination process whether the information processing apparatus is in the falling state by applying acceleration detection information in the past about the information processing apparatus based on history information stored in the storage part when it is determined that the information processing apparatus is in the zero gravity state in the first determination process, wherein for the second determination process, the fall determination step is the step of:
acquiring acceleration detection information from the storage part for a period right before a period that the information processing apparatus reaches the zero gravity state, executing a determination process whether a force equal to or greater than a predetermined threshold is applied to the information processing apparatus in a period before the information processing apparatus reaches the zero gravity state based on the acceleration detection information in the period, and determining whether the information processing apparatus is in the falling state based on the determination result.

6. The information processing method according to claim 5, wherein for the second determination process, the fall determination step is the step of:
acquiring acceleration detection information from the storage part for a period right before a period that the information processing apparatus reaches the zero gravity state, executing a determination process based on a variation in the acceleration per unit time until the information processing apparatus reaches the zero gravity state based on the acceleration detection information in the period, and determining whether the information processing apparatus is in the falling state based on the determination result.

7. The information processing method according to claim 5, wherein the acceleration detecting step is an acceleration detecting step done by a three-axis acceleration sensor which detects accelerations of three orthogonal axes of an X-axis, a Y-axis and a Z-axis, and
the fall determination step is the step of: computing a resultant value (Gavg) based on measured values in X-axis, Y-axis, and Z-axis directions detected by the three-axis acceleration sensor, and executing a determination process whether the information processing apparatus is in the falling state based on the resultant value.

8. The information processing method according to claim 7, wherein the fall determination step is the step of executing a process to compute a sum square value of acceleration information Gx, Gy, and Gz in X-axis, Y-axis, and Z-axis directions detected by the three-axis acceleration sensor as the resultant value (Gavg).

* * * * *